US012756522B2

(12) United States Patent
Liu

(10) Patent No.: US 12,756,522 B2
(45) Date of Patent: Oct. 6, 2026

(54) CORESET#0 CONFIGURATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 292 days.

(21) Appl. No.: 18/549,748

(22) PCT Filed: Mar. 22, 2021

(86) PCT No.: PCT/CN2021/082175
§ 371 (c)(1),
(2) Date: Sep. 8, 2023

(87) PCT Pub. No.: WO2022/198409
PCT Pub. Date: Sep. 29, 2022

(65) Prior Publication Data
US 2024/0154766 A1 May 9, 2024

(51) Int. Cl.
*H04W 72/23* (2023.01)
*H04L 5/00* (2006.01)
*H04L 27/26* (2006.01)

(52) U.S. Cl.
CPC .......... *H04L 5/0053* (2013.01); *H04L 5/0094* (2013.01)

(58) Field of Classification Search
CPC . H04L 5/0053; H04L 5/0094; H04L 27/2602; H04L 27/26025
See application file for complete search history.

(56) References Cited

U.S. PATENT DOCUMENTS

| | | | | |
|---|---|---|---|---|
| 12,213,110 B2 * | 1/2025 | Niu | ........................ | H04W 72/23 |
| 2021/0127283 A1 * | 4/2021 | Si | ........................... | H04W 48/12 |
| 2021/0176755 A1 * | 6/2021 | Liu | ................... | H04W 72/0453 |
| 2023/0069535 A1 * | 3/2023 | Luo | ........................ | H04L 5/0055 |
| 2023/0106166 A1 * | 4/2023 | Oteri | ..................... | H04L 5/0064 |

FOREIGN PATENT DOCUMENTS

| | | |
|---|---|---|
| CN | 109495227 A | 3/2019 |
| CN | 111316610 A | 6/2020 |

OTHER PUBLICATIONS

3GPP TSG RAN WG4 Meeting RAN#84, R4-1707957 Title:Discussion on inband blocking requirement fo range2 NR BS (Year: 2017).*
3GPP TSG RAN WG1 Meeting#87 R1-1612621 Title:DL synchronization signal structure in NR (Year: 2016).*
Extended European Search Report issued in Application No. 21932042.1 dated Apr. 10, 2024, 11 pages.
(Continued)

*Primary Examiner* — Faruk Hamza
*Assistant Examiner* — Abusayeed M Haque
(74) *Attorney, Agent, or Firm* — Finnegan, Henderson, Farabow, Garrett & Dunner, L.L.P.

(57) ABSTRACT

A method for configuring a control resource set (CORESET) #0 is performed by a base station, and includes: configuring the CORESET #0 according to a subcarrier spacing (SCS) of a synchronization signal and physical broadcast channel block (SSB).

20 Claims, 5 Drawing Sheets

(56) References Cited

OTHER PUBLICATIONS

ZTE, Sanechips, "Discussion on the initial access aspects for 52.6 to 71 GHz", 3GPP TSG RAN WG1 #104-e, R1-2100073, e-Meeting, Jan. 25-Feb. 5, 2021, 10 pages.
CATT, "Initial access aspects for up to 71GHz operation", 3GPP TSG RAN WG1 #104-e, R1-2100370, e-Meeting, Jan. 25-Feb. 5, 2021, 6 pages.
QualComm Incorporated, "Initial access aspects for NR to support operation between 52.6 GHz and 71 GHz", 3GPP TSG-RAN WG1 #104-e, R1-2101453, e-Meeting, Jan. 25-Feb. 5, 2021, 14 pages.
Moderator (Intel Corporation), "Summary #5 of email discussion on initial access aspect of NR extension up to 71 GHz", 3GPP TSG RAN WG1 Meeting #104-e, R1-2102238, e-Meeting, Jan. 25-Feb. 5, 2020, 198 pages.
QualComm; Intel Corporation, "Study on supporting NR from 52.6 GHz to 71 GHz", 3GPP TSG RAN meeting #91e, RP-210462, Electronic Meeting, Mar. 16-26, 2021, 14 pages.
The First Office Action for Chinese Application No. 202180000851.4, issued on Apr. 6, 2022, 11 pages.
Second Office Action for Chinese Application No. 202180000851.4, issued on Dec. 28, 2022, 18 pages.
International Search Report and Written Opinion of International Application No. PCT/CN2021/082175, dated Dec. 22, 2021, 15 pages.

* cited by examiner

CORESET#0 CONFIGURATION METHOD AND APPARATUS, COMMUNICATION DEVICE, AND STORAGE MEDIUM

CROSS REFERENCE TO RELATED APPLICATIONS

This application a U.S. national phase of International Application No. PCT/CN2021/082175, filed on Mar. 22, 2021, the entire contents of which are incorporated herein by reference.

TECHNICAL FIELD

The disclosure relates to, but is not limited to, a field of wireless communication technologies, in particular to a method for configuring a control resource set (CORESET) #0, an apparatus for configuring a CORESET #0, a communication device, and a storage medium.

BACKGROUND

A user equipment (UE) may perform cell search after being turned on. Usually, the cell search is mainly accomplished by detecting downlink synchronization channels and signals. For example, the UE goes through steps such as cell identity (ID) acquisition, frequency synchronization, and downlink time synchronization during the cell search process.

A Synchronization Signal and PBCH block (SSB) usually involves and is composed of a Primary Synchronization Signal (PSS), a Secondary Synchronization Signal (SSS) and a Physical Broadcast Channel (PBCH).

The control resource set (CORESET) #0 is a CORESET for scheduling a System Information Block 1 (SIB1). In detail, a Physical Downlink Control Channel (PDCCH) corresponding to SIB1 is mapped in a type0-PDCCH Common Search Space (CSS). In a frequency domain, the type0-PDCCH CSS is mapped to the CORESET #0.

The lower 4 bits of "pdcch-ConfigSIB1" of a signaling carried in the PBCH indicate configuration of the type0-PDCCH CSS, and the upper 4 bits indicate configuration of the CORESET #0.

SUMMARY

A first aspect of the disclosure provides a method for configuring a CORESET #0, performed by a base station. The method includes: configuring the CORESET #0 according to a subcarrier spacing (SCS) of a synchronization signal and physical broadcast channel block (SSB).

A second aspect of the disclosure provides a method for configuring a CORESET #0, performed by a user equipment (UE). The method includes: receiving configuration information of the CORESET #0 configured according to a SCS of a SSB.

A third aspect of the disclosure provides a communication device, including a processor, a transceiver, and a memory storing programs executable by the processor. When the processor executes the executable programs, the method for configuring a CORESET #0 of the first aspect or the second aspect is implemented.

It is understandable that the above general description and the following detailed descriptions are illustrative and explanatory only and are not used to limit embodiments of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the embodiments of the disclosure. Instead, they are merely examples of apparatuses and methods consistent with aspects related to the embodiments of the disclosure as recited in the appended claims.

The terms used in the embodiments of the disclosure are only for the purpose of describing specific embodiments, and are not intended to limit the embodiments of the disclosure. The singular forms of "a" and "the" used in the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
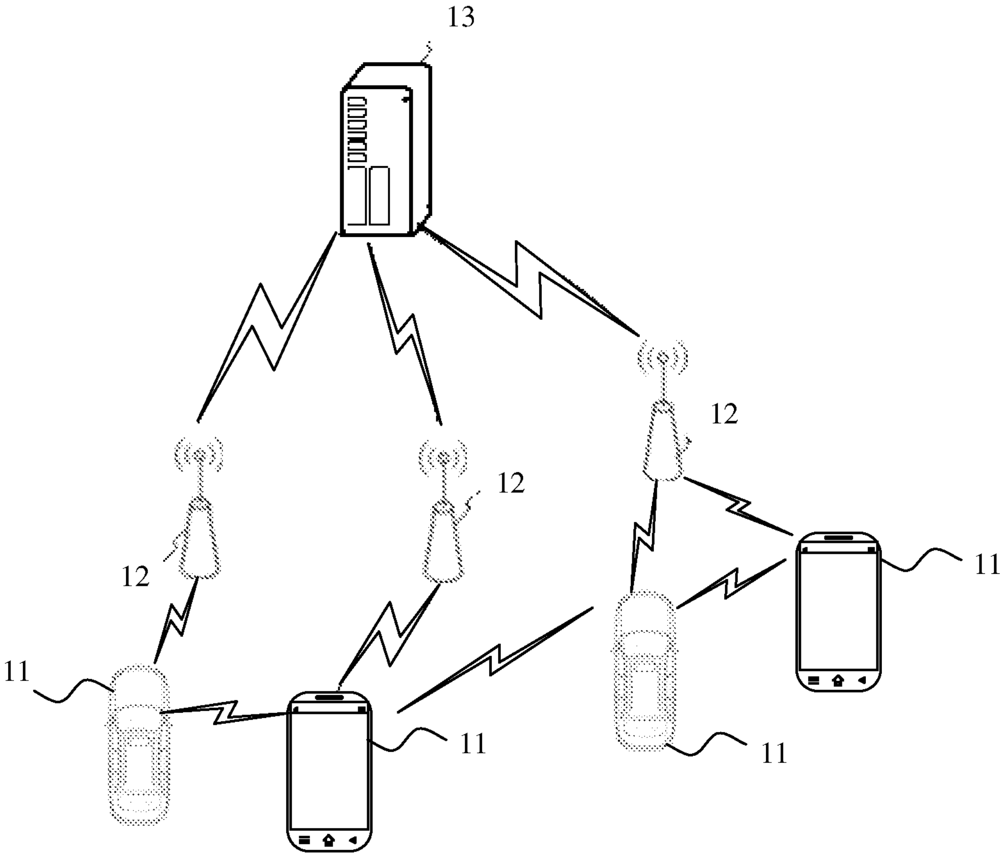
FIG. 1 is a schematic diagram of a wireless communication system according to an exemplary embodiment.

FIG. 1 is a schematic diagram of a wireless communication system according to an embodiment of the disclosure. As illustrated in FIG. 1, the wireless communication system is a communication system based on cellular mobile communication technology. The wireless communication system may include: a plurality of user equipments (UEs) 11 and a plurality of access devices 12.

The UE 11 may be a device that provides voice and/or data connectivity to a user. The UE 11 may communicate with one or more core networks via a Radio Access Network (RAN). The UE 11 may be an Internet of Things (IoT) UE, such as a sensor device, a mobile phone (or "cellular" phone), and a computer with an IoT UE. The UE 11 may also be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a UE. Or, the UE 11 may be an unmanned aerial vehicle device. Or, the UE 11 may be an in-vehicle device, for example, an electronic control unit (ECU) having a wireless communication function, or a wireless communication device external to the ECU. Or, the UE 11 can also be a roadside device, for example, a street light, a signal light, or other roadside devices having the wireless communication function.

The access device 12 may be a network side device in the wireless communication system. The wireless communication system may be the 4th Generation (4G) mobile communication system, also known as a Long Term Evolution (LTE) system. Or, the wireless communication system may also be a 5G system, also known as a New Radio (NR) system or a 5G NR system. Or, the wireless communication system may be any next generation system of the 5G system. The access network in the 5G system may be called a New Generation-RAN (NG-RAN) or a machine type communication (MTC) system.

The access device 12 can be an evolved access device (eNB) employed in the 4G system. Or, the access device 12 may be an access device (gNB) with a centralized distributed architecture employed in the 5G system. When the access device 12 adopts the centralized distributed architecture, it usually includes a Central Unit (CU) and at least two Distributed Units (DUs). The CU is equipped with protocol stacks of a Packet Data Convergence Protocol (PDCP) layer, a Radio Link Control (RLC) layer, or a Media Access Control (MAC) layer. The DU is equipped with a protocol stack of a physical (PHY) layer, and the specific implementation of the access device 12 is not limited in the embodiment of the disclosure.

A wireless connection can be established between the access device 12 and the UE 11 via a radio interface. In different implementations, the radio interface is a radio interface based on the 4G standard. Or, the radio interface is a radio interface based on the 5G standard, such as a NR. Or, the radio interface may also be a radio interface based on the standard of the next generation of 5G.

In some embodiments, End to End (E2E) connections can also be established between the UEs 11 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 13.

The plurality of access devices 12 are connected to the network management device 13 respectively. The network management device 13 may be a core network device in the wireless communication system, for example, a Mobility Management Entity (MME) in an Evolved Packet Core (EPC). Or, the network management device may be other core network devices, such as a Serving GateWay (SGW), a Public Data Network GateWay (PGW), a Policy and Charging Rules Function (PCRF), or a Home Subscriber Server (HSS), etc. The implementation form of the network management device 13 is not limited in the embodiments of the disclosure.

Figure 2A:
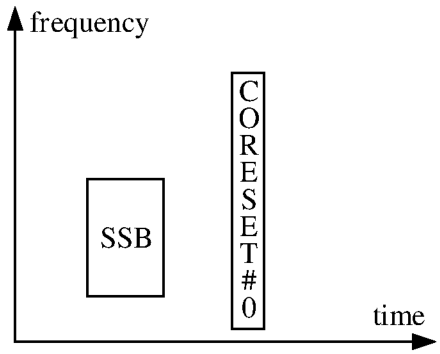
FIG. 2A is a schematic diagram of a multiplexing pattern 1 of a SSB and a CORESET #0 according to an exemplary embodiment.
Figure 2B:
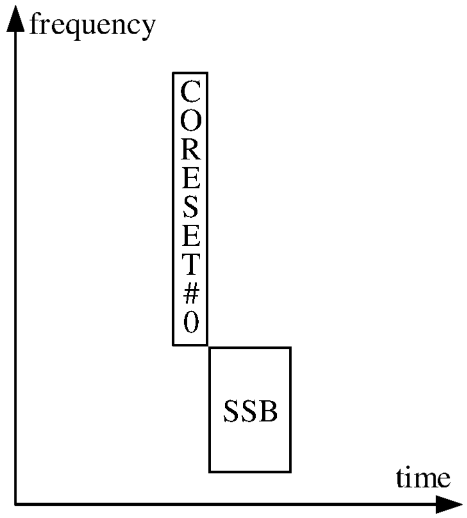
FIG. 2B is a schematic diagram of a multiplexing pattern 2 of a SSB and a CORESET #0 according to an exemplary embodiment.
Figure 2C:
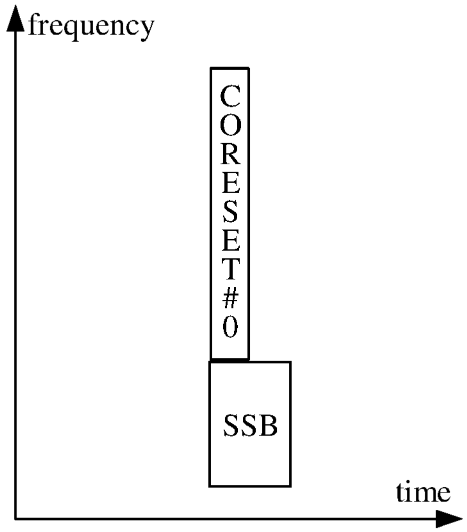
FIG. 2C is a schematic diagram of a multiplexing pattern 3 of a SSB and a CORESET #0 according to an exemplary embodiment.

Configuration of a control resource set (CORES ET) #0 may include at least one of the followings:

- a multiplexing pattern of a synchronization signal and physical broadcast channel block (SSB) and the CORESET #0, which may be one of: pattern 1, pattern 2 and pattern 3. Pattern 1 may be as shown in FIG. 2A, pattern 2 may be as shown in FIG. 2B, and pattern 3 may be as shown in FIG. 2C;
- a number of resource blocks (RBs) occupied by the CORESET #0;
- a number of symbols occupied by the CORESET #0;
- a number of RBs offset between a lower boundary of the CORESET #0 and a lower boundary of the SSB on a frequency domain, which is indicated by an offset (Offset); or
- an offset value $k_{SSB}$, $k_{SSB}$ indicates a number of Resource Elements (REs) offset between the lower boundary of the SSB and the lower boundary of the CORESET #0 after the number (Offset) of RBs are spaced between the lower boundary of the SSB and the lower boundary of the CORESET #0.

A 52.6 GHz carrier can use a higher subcarrier spacing (SCS). For example, the SCS can be as high as 960 kHz. That is, a maximum SCS of data can reach 960 kHz, and other optional values are 480k kHz, 240 kHz, 120 kHz, and 60 kHz. The frequency range of the frequency range 2 (FR2) for 5G is a range of 7.126 Ghz to 52.6 Ghz, and the SCS of the SSB of RF2 adopts 240 kHz or 120 kHz. For 52.6 GHz to 71 GHz. In order to support unlicensed and simplified system designs, data and the SSB adopt the same SCS as far as possible. In this way, for the SCS of large data, the SCS of the SSB may support new (non-existing) designs.

In the related art, only two kinds of SCS are supported in the SSB. If a new high SCS needs to be supported, a new design method needs to be given, taking into account both licensed bands and unlicensed bands. Meanwhile, a higher frequency band may introduce a new beam-based Listen Before Talk (LBT), which requires that there are idle symbols between SSBs for performing LBT. This is not supported by the SSB pattern involves two SCSs in the FR2 band in the relate art. The configuration of the SSB and the CORESET #0 in the related art can be as one or more elements in Table 1, Table 2, Table 3 or Table 4.

Table 1 is a set of resource blocks and slot symbols of CORESET for Type0—Physical Downlink Control Channel (PDCCH) search space set when SCSs of {SSB, PDCCH} is {120, 60} kHz.

Table 2 is a set of resource blocks and slot symbols of CORESET for Type0-PDCCH search space set when SCSs of {SSB, PDCCH} is {120, 120} kHz.

Table 3 is a set of resource blocks and slot symbols of CORESET for Type0-PDCCH search space set when SCSs of {SSB, PDCCH} is {240, 60} kHz.

Table 4 is a set of resource blocks and slot symbols of CORESET for Type0-PDCCH search space set when SCSs of {SSB, PDCCH} is {240, 120} kHz.

TABLE 1

| Index | multiplexing pattern of SSB and CORESET#0 | $N_{RB}^{CORESET}$ | $N_{symb}^{CORESET}$ | number of offset RBs (Offset) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 1 | 48 | 3 | 0 |
| 5 | 1 | 48 | 3 | 8 |
| 6 | 1 | 96 | 1 | 28 |
| 7 | 1 | 96 | 2 | 28 |
| 8 | 2 | 48 | 1 | if $k_{SSB}$ = 0, Offset = −41, and if $k_{SSB}$ > 0, Offset = −42 |
| 9 | 2 | 48 | 1 | 49 |
| 10 | 2 | 96 | 1 | if $k_{SSB}$ = 0, Offset = −41, and if $k_{SSB}$ > 0, Offset = −42 |
| 11 | 2 | 96 | 1 | 97 |
| 12 | | | Reserved | |
| 13 | | | Reserved | |
| 14 | | | Reserved | |
| 15 | | | Reserved | |

TABLE 2

| Index | multiplexing pattern of SSB and CORESET#0 | $N_{RB}^{CORESET}$ | $N_{symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | if $k_{SSB}$ = 0, Offset = −20, and if $k_{SSB}$ > 0, Offset = −21 |
| 5 | 3 | 24 | 2 | 24 |
| 6 | 3 | 48 | 2 | if $k_{SSB}$ = 0, Offset = −20, and if $k_{SSB}$ > 0, Offset = −21 |
| 7 | 3 | 48 | 2 | 48 |
| 8 | | | Reserved | |
| 9 | | | Reserved | |
| 10 | | | Reserved | |
| 11 | | | Reserved | |
| 12 | | | Reserved | |
| 13 | | | Reserved | |
| 14 | | | Reserved | |
| 15 | | | Reserved | |

TABLE 3

| Index | multiplexing pattern of SSB and CORESET#0 | $N_{RB}^{CORESET}$ | $N_{symb}^{CORESET}$ | Offset (RBs) |
|---|---|---|---|---|
| 0 | 1 | 96 | 1 | 0 |
| 1 | 1 | 96 | 1 | 16 |
| 2 | 1 | 96 | 2 | 0 |
| 3 | 1 | 96 | 2 | 16 |
| 4 | | | Reserved | |
| 5 | | | Reserved | |
| 6 | | | Reserved | |
| 7 | | | Reserved | |
| 8 | | | Reserved | |
| 9 | | | Reserved | |
| 10 | | | Reserved | |
| 11 | | | Reserved | |
| 12 | | | Reserved | |
| 13 | | | Reserved | |

TABLE 3-continued

| Index | multiplexing pattern of SSB and CORESET#0 | $N_{RB}^{CORESET}$ | $N_{symb}^{CORESET}$ | Offset (RBs) |
|---|---|---|---|---|
| 14 | | | Reserved | |
| 15 | | | Reserved | |

TABLE 4

| Index | multiplexing pattern of CORESET#0 and SSB | $N_{RB}^{CORESET}$ | $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | if $k_{SSB}$ = 0, Offset = −41, and if $k_{SSB}$ > 0, Offset = −42 |
| 5 | 2 | 24 | 1 | 25 |
| 6 | 2 | 48 | 1 | if $k_{SSB}$ = 0, Offset = −41, and if $k_{SSB}$ > 0, Offset = −42 |
| 7 | 2 | 48 | 1 | 49 |
| 8 | | | Reserved | |
| 9 | | | Reserved | |
| 10 | | | Reserved | |
| 11 | | | Reserved | |
| 12 | | | Reserved | |
| 13 | | | Reserved | |
| 14 | | | Reserved | |
| 15 | | | Reserved | |

In Tables 1 to 4, $$N_{RB}^{CORESET}$$

indicates the number of RBs in the frequency domain occupied by the CORESET #0, and $$N_{symb}^{CORESET}$$

indicates the number of symbols in the time domain occupied by the CORESET #0.

In case of a new SCS (e.g., 240 kHz, 480 kHz, or 960 kHz), the SCS being 60 kHz in the configuration of CORESET #0 containing 60 kHz and 240 kHz in the related art is replaced with the new SCS, and associated tables are rewritten.

If the SCS of the SSB uses 240 kHz, the SCSs of the SSB in the related art are replaced with {240, 240}, {120, 240} respectively, and associated tables are rewritten.

Since the SCS is changed, a bit used to indicate a Quasi Co-Location (QCL) in the unlicensed band (New radio unlicensed band, NRU) becomes unusable and needs to be newly defined. Because there are no other reserved bits, it may be defined in the table. That is, the SCS used for the representation of the QCL in the unauthorized band needs to be removed from the table.

In an embodiment, a QCL representation method is provided as follows:

representing using a reserved/unused bits of an offset value (Offset), i.e., representing using a combination of values of an offset and the QCL.

In view of this, a configuration table of the CORESET #0 is redefined as Table 5 according to the SCS of the SSB, which is provided as follows:

TABLE 5

| Index | multiplexing pattern of SSB and CORESET#0 | $N_{RB}^{CORESET}$ | $N_{symb}^{CORESET}$ | Offset (RBs)/QCL |
|---|---|---|---|---|
| 0 | 2 | 48 | 1 | type-A QCL, if $k_{SSB}$ = 0, Offset = −41, and if $k_{SSB}$ > 0, Offset = −42 |
| 1 | 2 | 48 | 1 | type-B QCL, if $k_{SSB}$ = 0, Offset = −41, and if $k_{SSB}$ > 0, Offset = −42 |
| 2 | 2 | 96 | 1 | type-C QCL, if $k_{SSB}$ = 0, Offset = −41, and if $k_{SSB}$ > 0, Offset = −42 |
| 3 | 2 | 96 | 1 | type-D QCL, if $k_{SSB}$ = 0, Offset = −41, and if $k_{SSB}$ > 0, Offset = −42 |
| 4 | 2 | 48 | 1 | type-A QCL, 49 |
| 5 | 2 | 48 | 1 | type-B QCL, 49 |
| 6 | 2 | 96 | 1 | type-C QCL, 49 |
| 7 | 2 | 96 | 1 | type-D QCL, 49 |
| 8 | 2 | 48 | 1 | 97 |
| 9 | 2 | 48 | 1 | 97 |
| 10 | 2 | 96 | 1 | 97 |
| 11 | 2 | 96 | 1 | 97 |
| 12 | | | Reserved | |
| 13 | | | Reserved | |
| 14 | | | Reserved | |
| 15 | | | Reserved | |

In Table 5, $$N_{RB}^{CORESET}$$

indicates the number of RBs in the frequency domain occupied by the CORESET #0, and $$N_{symb}^{CORESET}$$

indicates the number of symbols in the time domain occupied by the CORESET #0.

The configuration of the CORESET #0 shown in Table 5 can be carried out for the SCS of the SSB being 120 kHz, 240 kHz, 480 kHz, or 960 kHz.

A SCS indication is defined as one bit in the SSB indicating the SCS of the CORESET #0.

If the SSB uses one of 480 kHz or 960 kHz (indicated by x), the SCS indication in the SSB represents that the SCS of the CORESET #0 is {120, x} or {x, 120}, depending on the SCS of the SSB. If 240 kHz is used, the bit in the SSB indicates that the SCS of the CORESET #0 is {120, 240}.

It is noted that when configuring the CORESET #0, each element in Table 5 can be used alone, or multiple elements can be used in combination.

Figure 3:
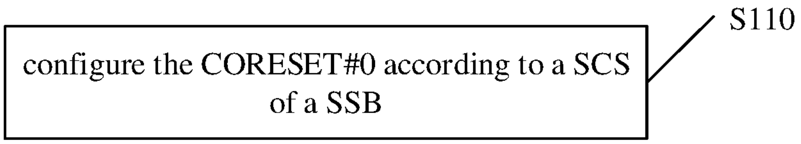
FIG. 3 is a flowchart of a method for configuring a control resource set (CORESET) #0 according to an exemplary embodiment.

As illustrated in FIG. 3, an embodiment of the disclosure provides a method for configuring a CORESET #0, which is performed by a base station. The method includes the following steps.

At step S110, the CORESET #0 is configured according to a SCS of a SSB.

Both the SCS of the SSB and the configuration of the CORESET #0 need to meet a bandwidth supported by a UE. If the SCS of SSB and/or a SCS of the CORESET #0 exceeds the bandwidth supported by the UE, it may cause the UE to fail to receive the information transmitted by the SSB and the CORESET #0. Or, if a bandwidth configured for the SCS of the SSB and/or the CORESET #0 is too small, the information transmitted by the SSB and the CORESET #0 occupies a large amount of time resources in the time domain, resulting in a larger transmission delay.

In the embodiment of the disclosure, the SCS of the SSB is configured according to the bandwidth supported by the UE, and the CORESET #0 is usually a CORESET that is closest to the SSB and monitored when the UE initially accesses. If the CORESET #0 is configured according to the SCS of the SSB, the CORESET #0 that is usable for the UE can be configured without re-determining the bandwidth supported by the UE.

In this way, in the embodiment of the disclosure, after the SCS of the SSB is determined, one or more of: the SCS of the CORESET #0, a frequency-domain relative location and/or a time-domain relative location between the CORESET #0 and the SSB are determined, which has the feature of easy configuration of the CORESET #0.

In an embodiment, when a system bandwidth is 52.6 Ghz to 71 Ghz, the CORESET #0 is configured according to the SCS of the SSB. Or, when the system bandwidth is above 52.6 Ghz or above 71 Ghz, the CORESET #0 is configured according to the SCS of the SSB.

In an embodiment of the disclosure, configuring the CORESET #0 includes at least one of the followings:

- configuring a multiplexing pattern of the SSB and the CORESET #0;
- configuring a number of RBs occupied by CORESET #0;
- configuring a number of symbols occupied by CORESET #0;
- configuring an offset (Offset) of RBs between a lower boundary of the SSB and a lower boundary of the CORESET #0 on a frequency domain; or
- configuring an offset value $k_{SSB}$, which indicates a number of REs offset between the lower boundary of the SSB and the lower boundary of the CORESET #0 after a number (Offset) of RBs are spaced between the lower boundary of the SSB and the lower boundary of the CORESET #0. In an embodiment, a candidate value of the SCS of the SSB includes at least one of the followings:

120 kHz;
240 kHz;
480 kHz; and
960 kHz.

In the embodiment of the disclosure, the candidate value supported by the SCS of the SSB is an integer multiple of 120 kHz from 120 kHz to 960 kHz, which has the characteristic that the SCS of the SSB is large. That is, the frequency domain bandwidth occupied by the SSB is large. Thus, the time domain resources occupied by the SSB may be relatively reduced. In this way, the duration for the UE to receive the SSB may be short, which improves the transmission efficiency of the SSB.

In another embodiment of the present disclosure, configuring the CORESET #0 according to the SCS of the SSB includes:

- in response to the SCS of the SSB being 240 kHz, configuring a SCS of the CORESET #0 to one of 120 kHz, 240 kHz, 480 kHz and 960 kHz;

- in response to the SCS of the SSB being 480 kHz, configuring the SCS of the CORESET #0 to one of 120 kHz, 240 kHz, 480 kHz and 960 kHz; and
- in response to the SCS of the SSB being 960 kHz, configuring the SCS of the CORESET #0 to one of 120 kHz, 240 kHz, 480 kHz and 960 kHz.

Since the SCS of the SSB reaches 240 kHz or above, similarly, the SCS of the CORESET #0 is configured to be 120 kHz or above, so that a frequency domain bandwidth occupied by the CORESET #0 increases, which reduces the time domain resources occupied by the CORESET #0, and improves the transmission efficiency of the information transmitted by the CORESET #0.

In some embodiments, the SSB carries an indication bit for indicating the SCS of the CORESET #0.

In this way, the SSB carries the indication bit, after receiving the SSB, the UE can know the SCS of the CORESET #0 according to the indication bit in the SSB. For example, the indication bit is carried within a Physical Broadcast Channel (PBCH) of the SSB.

In an embodiment of the disclosure, a carrier band in which the SSB and the CORESET #0 are located includes:

a first band;

and/or, a second band.

A frequency of the second band is lower than a frequency of the first band.

The first band is a high-frequency band relative to the second band. In the embodiments of the disclosure, the method for configuring a CORESET #0 can be applied to a high-frequency band and a low-frequency band.

In an embodiment of the disclosure, the first band may include: any band with a frequency equal to or greater than 52.6 Ghz. For example, the first band may be a band with a frequency within the range from 52.6 Ghz to 74 Ghz.

In some embodiments, in response to the carrier band in which the SSB and the CORESET #0 are located being the first band, the SCS of the SSB and a QCL use different indication bits;

and/or, in response to the carrier band in which the SSB and the CORESET #0 are located being the second band, the SCS of the SSB and the QCL use the same indication bit.

For the CORESET #0 and the SSB configured on different bands, the number of SCSs supported by the SSB are differently. If the number of SCSs supported by the SSB is small, the indication bit for indicating the SCS of the SSB may have a remaining bit value for indicating the QCL. Therefore, since the first band is a high-frequency band, it supports a large number of candidate SCSs, so that more indication bits is required for indicating the SCS of the SSB, and thus the indication bit for indicating the SCS of the SSB no longer indicate the QCL.

The second band is a low frequency band. A system bandwidth cell of the low frequency band is small, thus it supports a small amount of SCSs of the SSB, so that the indication bit for indicating the SCS of SSB may have a remaining bit value that can be used to indicate the QCL, thereby reducing bit overhead.

In some embodiments, in response to the SCS of the SSB and the QCL using different indication bits, the QCL shares the same indication bit with a first offset value between the SSB and the CORESET #0. The first offset value is a number of RBs offset between the SSB and the CORESET #0.

In order to save bit overhead, if the carrier band in which the SSB and the CORESET #0 are located is the first band, the first offset value and the QCL share the same indication bit, thereby realizing the feature of small bit overhead.

In some embodiments, a bit value of the indication bit for indicating the first offset value between the SSB and the CORESET #0 is different from a bit value for indicating the QCL.

In some embodiments, four types of indication values of the QCL are indicated by the same bit value shared by different indication indexes.

In some embodiments, configuring the CORESET #0 according to the SCS of the SSB includes at least one of the followings:

- in response to the SCS of the SSB including at least one of 240 kHz, 480 kHz and 960 kHz, configuring a multiplexing pattern of the CORESET #0 and the SSB to pattern 2;
- in response to the SCS of the SSB including at least one of 240 kHz, 480 kHz and 960 kHz, configuring a number of symbols occupied by the CORESET #0 in a time domain to be 1;
- in response to the SCS of the SSB including at least one of 240 kHz, 480 kHz and 960 kHz, configuring a number of RBs occupied by the CORESET #0 in a frequency domain to be 48 or 96; and
- in response to the SCS of the SSB including at least one of 240 kHz, 480 kHz and 960 kHz, configuring a number of RBs spaced between a frequency domain lower boundary of the CORESET #0 and a frequency domain lower boundary of the SSB to be 97, −41 or −42.

In the embodiment of the disclosure, since the system bandwidth is sufficiently large, in order to further reduce the transmission delay and improve the transmission efficiency, the multiplexing pattern of the CORESET #0 and the SSB uses pattern 2, i.e., frequency division multiplexing is performed in the frequency domain, and the CORESET #0 and the SSB are aligned at a starting location in the time domain.

The CORESET #0 supports at least one of 240 kHz, 480 kHz and 960 kHz, i.e., the CORESET #0 occupies a sufficiently large bandwidth on each time-domain unit, the amount of information that can be sent by the CORESET #0 corresponding to in frequency-domain resource unit corresponding to a symbol in the time domain is increased Therefore, 1 symbol configured in the time domain can be sufficient to accomplish the transmission of the information to be carried by the CORESET #0.

In an embodiment, $k_{SSB}$ is used to indicate a number of REs offset between the frequency domain lower boundary of the CORESET #0 and the frequency domain lower boundary of the SSB after the number of RBs are spaced between the frequency domain lower boundary of the CORESET #0 and the frequency domain lower boundary of the SSB.

If the SCS of the SSB is one of 240 kHz, 480 kHz and 960 kHz, the number of RBs configured for the CORESET #0 in the frequency domain is 48 or 96, which is highly compatible with the related art, and can configure 48 or 96 RBs in the case of the SCS of the SSB or the SCS of the CORESET #0 being 240 kHz, 480 kHz and 960 kHz, so that the bandwidth of the CORESET #0 is sufficiently large to realize fast transmission through large bandwidth occupation in the frequency domain.

In some embodiments, in response to the SCS of the SSB including at least one of 240 kHz, 480 kHz and 960 kHz, configuring the number of RBs spaced between the frequency domain lower boundary of the CORESET #0 and the frequency domain lower boundary of the SSB to be 97, −41 or −42, includes at least one of the followings:

in response to the SCS of the SSB including at least one of 240 kHz, 480 kHz and 960 kHz, and the number of REs indicated by the $k_{SSB}$ being 0, configuring the number of RBs spaced between the frequency domain lower boundary of the CORESET #0 and the frequency domain lower boundary of the SSB to be −41;

in response to the SCS of the SSB including at least one of 240 kHz, 480 kHz and 960 kHz, and the number of REs indicated by the $k_{SSB}$ being greater than 0, configuring the number of RBs spaced between the frequency domain lower boundary of the CORESET #0 and the frequency domain lower boundary of the SSB to be −42; and in response to the SCS of the SSB including at least one of 240 kHz, 480 kHz and 960 kHz, and the number of REs indicated by the $k_{SSB}$ being any real number, configuring the number of RBs spaced between the frequency domain lower boundary of the CORESET #0 and the frequency domain lower boundary of the SSB to be 97.

In a specific implementation, there are multiple numbers of RBs spaced between the frequency domain lower boundary of the CORESET #0 and the frequency domain lower boundary of the SSB. In the embodiment of the disclosure, the number of RBs spaced between the frequency domain lower boundary of the CORESET #0 and the frequency domain lower boundary of the SSB is configured to be at least one of 97, −41 and −42, and the specific number is further determined according to the number of REs during configuration, so that the implementation is simple and conforms to the phenomenon of minimal waste of resources.

Figure 4:
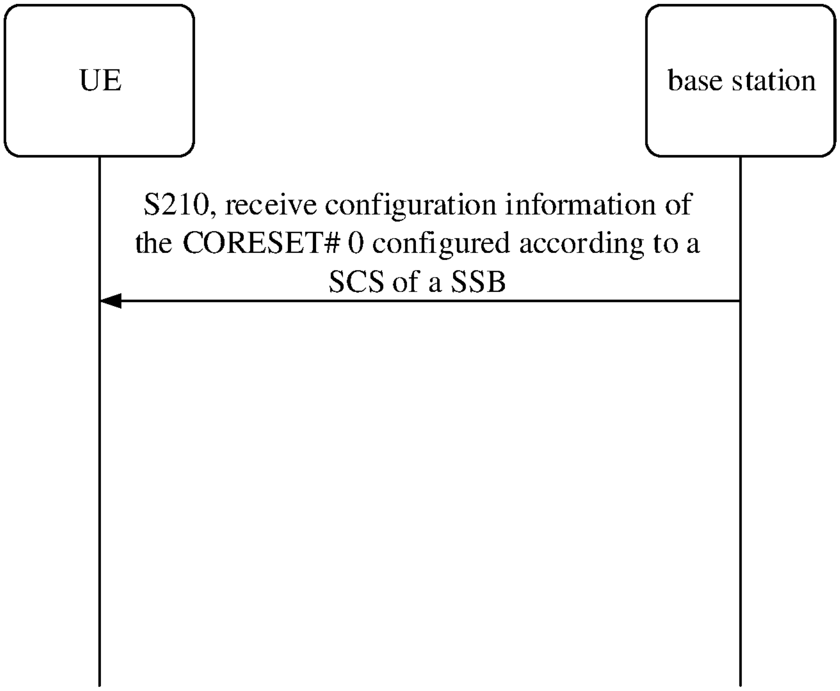
FIG. 4 is a flowchart of a method for configuring a CORESET #0 according to an exemplary embodiment.

As illustrated in FIG. 4, an embodiment of the disclosure provides a method for configuring a CORESET #0, which is performed by a UE. The method includes the following steps.

At step S210, configuration information of the CORESET #0 configured according to a SCS of a SSB is received.

The configuration information may be in the pdcch-ConfigSIB1 signaling carried by a PBCH. In the embodiment of the disclosure, the configuration information of the CORESET#0 is configured according to the SCS of the SSB.

In some embodiments, a candidate value of the SCS of the SSB includes at least one of the followings:

120 kHz;

240 kHz;

480 kHz; and 960 kHz.

In the embodiment of the disclosure, the SSB is aimed at the large system bandwidth of 5G or the system bandwidth of any future mobile communication generation of 5G. Therefore, the SCS of the SSB does not use the small SCS of 60 kHz. By using the large SCS configuration, the amount of information carried by the CORESET #0 can be increased and can occupy less resources in the time domain, thereby reducing the transmission delay.

In some embodiments, the configuration information indicates that:

in response to the SCS of the SSB being 240 kHz, a SCS of the CORESET #0 being one of 120 kHz, 240 kHz, 480 kHz and 960 kHz;

or in response to the SCS of the SSB being 480 kHz, the SCS of the CORESET #0 being one of 120 kHz, 240 kHz, 480 kHz and 960 kHz;

or in response to the SCS of the SSB being 960 kHz, the SCS of the CORESET #0 eing one of 120 kHz, 240 kHz, 480 kHz and 960 kHz.

In some embodiments, the SSB carries an indication bit for indicating the SCS of the CORESET #0.

In some embodiments, a carrier band in which the SSB and the CORESET #0 are located includes:

a first band;

and/or, a second band.

A frequency of the second band is lower than a frequency of the first band.

For example, the first band includes: 52.6 GHz to 74 GHz.

For example, in response to the carrier band in which the SSB and the CORESET #0 are located being the first band, the SCS of the SSB and a QCL use different indication bits;

and/or, in response to the carrier band in which the SSB and the CORESET #0 are located being the second band, the SCS of the SSB and the QCL use the same indication bit.

For example, in response to the SCS of the SSB and the QCL using different indication bits, the QCL shares the same indication bit with a first offset value between the SSB and the CORESET #0, in which the first offset value is a number of RBs offset between the SSB and the CORESET #0.

For example, a bit value of the indication bit used to indicate the first offset value between the SSB and the CORESET #0 is different from a bit value for indicating the QCL.

For example, four types of indication values of the QCL are indicated by the same bit value shared by different indication indexes.

For example, the configuration information indicates at least one of the followings:

in response to the SCS of the SSB including at least one of 240 kHz, 480 kHz and 960 kHz, a multiplexing pattern of the CORESET #0 and the SSB being pattern 2;

in response to the SCS of the SSB including at least one of 240 kHz, 480 kHz and 960 kHz, a number of symbols occupied by the CORESET #0 in a time domain being 1;

in response to the SCS of the SSB including at least one of 240 kHz, 480 kHz and 960 kHz, a number of RBs occupied by the CORESET #0 in a frequency domain being 48 or 96; and in response to the SCS of the SSB including at least one of 240 kHz, 480 kHz and 960 kHz, a number of RBs spaced between a frequency domain lower boundary of the CORESET #0 and a frequency domain lower boundary of the SSB being 97, −41 or −42.

For example, the configuration information includes a $k_{SSB}$, the $k_{SSB}$ indicates a number of REs indicated by $k_{SSB}$ offset between the frequency domain lower boundary of the CORESET #0 and the frequency domain lower boundary of the SSB after the number of RBs are spaced between the frequency domain lower boundary of the CORESET #0 and the frequency domain lower boundary of the SSB.

For example, in response to the SCS of the SSB including at least one of 240 kHz, 480 kHz and 960 kHz, the number of RBs spaced between the frequency domain lower boundary of the CORESET #0 and the frequency domain lower boundary of the SSB being 97, −41 or −42, including at least one of the followings:

in response to the SCS of the SSB including at least one of 240 kHz, 480 kHz and 960 kHz, and the number of REs indicated by the $k_{SSB}$ being 0, the number of RBs spaced between the frequency domain lower boundary of the CORESET #0 and the frequency domain lower boundary of the SSB being −41;

in response to the SCS of the SSB including at least one of 240 kHz, 480 kHz and 960 kHz, and the number of REs indicated by the $k_{SSB}$ being greater than 0, the number of RBs spaced between the frequency domain lower boundary of the CORESET #0 and the frequency domain lower boundary of the SSB being −42; and in response to the SCS of the SSB including at least one of 240 kHz, 480 kHz and 960 kHz, and the number of REs indicated by the $k_{SSB}$ being any real number, the number of RBs spaced between the frequency domain lower boundary of the CORESET #0 and the frequency domain lower boundary of the SSB being 97.

The embodiment of the disclosure provides a configuration of a CORESET #0 that may be as follows: in the case of a new SCS (e.g., 960 kHz) of the SSB, the SCS being 60 kHz in the configuration of CORESET #0 containing 60 kHz and 240 kHz is replaced with the new SCS, and associated configuration tables of CORESET #0 are rewritten. For example, the configurations in the preceding Tables 1, 2, and 3 are modified by changing the 60 kHz of the CORESET #0 to 240 kHz, 480 kHz, or 960 kHz.

For example, if the SCS of the SSB uses 240 kHz, the configurations of SCS in Tables 1 and 3 are replaced with {240, 240} and {120, 240} respectively, and the configuration table for CORESET #0 is rewritten. The rewritten configuration table can be shown in Table 5.

Since the SCS is changed, a bit used to indicate the QCL in the unauthorized band (New radio unlicensed band, NRU) becomes unusable and needs to be newly defined. Because there are no other reserved bits, it may be defined in the table. That is, the SCS used for the representation of the QCL in the unauthorized band needs to be removed from the table.

In view of this, the specific QCL representation method is provided as follows: representing using a reserved/unused bit of the offset value (Offset), i.e., representing using a combination of values of the offset and the QCL.

The indication for SCS may be represented by one bit in the SSB, such as CORESET #0 SCS indication.

If the SSB uses one of 480 kHz and 960 kHz (indicated by x), the SCS indication in the SSB represents {120, x} or {x, 120}, depending on the SCS of the SSB. If 240 kHz is used, the SCS indication in the SSB represents {120, 240}.

TABLE 5

| Index | multiplexing pattern of CORESET#0 and SSB | $N_{RB}^{CORESET}$ | $N_{symb}^{CORESET}$ | Offset (RBs)/QCL |
|---|---|---|---|---|
| 0 | 2 | 48 | 1 | type-A QCL, if $k_{SSB}$ = 0, Offset = −41, and if $k_{SSB}$ > 0, Offset = −42 |
| 1 | 2 | 48 | 1 | type-B QCL, if $k_{SSB}$ = 0, Offset = −41, and if $k_{SSB}$ > 0, Offset = −42 |
| 2 | 2 | 96 | 1 | type-C QCL, if $k_{SSB}$ = 0, Offset = −41, and if $k_{SSB}$ > 0, Offset = −42 |

TABLE 5-continued

| Index | multiplexing pattern of CORESET#0 and SSB | $N_{RB}^{CORESET}$ | $N_{symb}^{CORESET}$ | Offset (RBs)/QCL |
|---|---|---|---|---|
| 3 | 2 | 96 | 1 | type-D QCL, if $k_{SSB}$ = 0, Offset = −41, and if $k_{SSB}$ > 0, Offset = −42 |
| 4 | 2 | 48 | 1 | type-A QCL, 49 |
| 5 | 2 | 48 | 1 | type-B QCL,49 |
| 6 | 2 | 96 | 1 | type-C QCL,49 |
| 7 | 2 | 96 | 1 | type-D QCL,49 |
| 8 | 2 | 48 | 1 | 97 |
| 9 | 2 | 48 | 1 | 97 |
| 10 | 2 | 96 | 1 | 97 |
| 11 | 2 | 96 | 1 | 97 |
| 12 | | | Reserved | |
| 13 | | | Reserved | |
| 14 | | | Reserved | |
| 15 | | | Reserved | |

Figure 5:
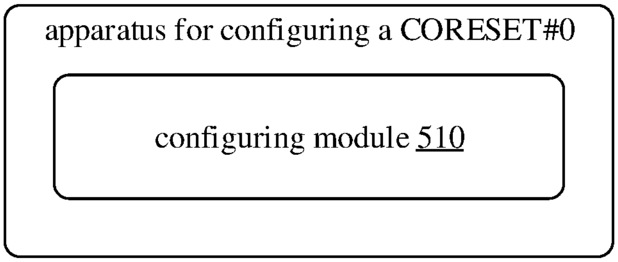
FIG. 5 is a block diagram of an apparatus for configuring a CORESET #0 according to an exemplary embodiment.

As illustrated in FIG. 5, an embodiment of the disclosure provides an apparatus for configuring a CORESET #0, which is executed by a base station. The apparatus includes:

a configuring module 510, configured to configure the CORESET #0 according to a SCS of a SSB.

In some embodiments, the configuring module 510 may be a program module. After the program module is executed by a processor, it can configure the CORESET #0 according to the SCS of the SSB.

In some embodiments, the configuring module 510 may further include: a hardware and software combination module. The hardware and software combination module includes but is not limited to: a programmable array. The programmable array includes but is not limited to: a field programmable array or a complex programmable array.

In some embodiments, the configuring module 510 may further include: a pure hardware module. The pure hardware module includes but is not limited to: an application specific integrated circuit.

It can be understood that a candidate value of the SCS of the SSB includes at least one of the followings:

120 kHz;

240 kHz;

480 kHz; and 960 kHz.

It can be understood that the configuring module 510 is configured to implement at least one of:

in response to the SCS of the SSB being 240 kHz, configuring a SCS of the CORESET #0 to one of 120 kHz, 240 kHz, 480 kHz and 960 kHz;

in response to the SCS of the SSB being 480 kHz, configuring the SCS of the CORESET #0 to one of 120 kHz, 240 kHz, 480 kHz and 960 kHz; and in response to the SCS of the SSB being 960 kHz, configuring the SCS of the CORESET #0 to one of 120 kHz, 240 kHz, 480 kHz and 960 kHz.

It can be understood that the SSB carries an indication bit for indicating the SCS of the CORESET #0.

It can be understood that a carrier band in which the SSB and the CORESET #0 are located includes:

a first band;

and/or, a second band; in which a frequency of the second band is lower than a frequency of the first band.

It can be understood that the first band includes: 52.6 GHz to 74 GHz.

It can be understood that in response to the carrier band in which the SSB and the CORESET #0 are located being the first band, the SCS of the SSB and a QCL use different indication bits;

and/or, in response to the carrier band in which the SSB and the CORESET #0 are located being the second band, the SCS of the SSB and the QCL use the same indication bit.

It can be understood that in response to the SCS of the SSB and the QCL using different indication bits, the QCL shares the same indication bit with a first offset value between the SSB and the CORESET #0, in which the first offset value is a number of RBs offset between the SSB and the CORESET #0.

It can be understood that a bit value of the indication bit used to indicate the first offset value between the SSB and the CORESET #0 is different from a bit value for indicating the QCL.

It can be understood that four types of indication values of the QCL are indicated by the same bit value shared by different indication indexes.

It can be understood that configuring the CORESET #0 according to the SCS of the SSB includes at least one of the followings:

in response to the SCS of the SSB comprising at least one of 240 kHz, 480 kHz and 960 kHz, configuring a multiplexing pattern of the CORESET #0 and the SSB to pattern 2;

in response to the SCS of the SSB comprising at least one of 240 kHz, 480 kHz and 960 kHz, configuring a number of symbols occupied by the CORESET #0 in a time domain to be 1;

in response to the SCS of the SSB comprising at least one of 240 kHz, 480 kHz and 960 kHz, configuring a number of RBs occupied by the CORESET #0 in a frequency domain to be 48 or 96; and in response to the SCS of the SSB comprising at least one of 240 kHz, 480 kHz and 960 kHz, configuring a number of RBs spaced between a frequency domain lower boundary of the CORESET #0 and a frequency domain lower boundary of the SSB to be 97, −41 or −42.

It can be understood that $k_{SSB}$ is used to indicate a number of REs offset between the frequency domain lower boundary of the CORESET #0 and the frequency domain lower boundary of the SSB after the number of RBs are spaced between the frequency domain lower boundary of the CORESET #0 and the frequency domain lower boundary of the SSB.

It can be understood that the configuring module 510 is configured to implement at least one of:

in response to the SCS of the SSB comprising at least one of 240 kHz, 480 kHz and 960 kHz, and the number of REs indicated by the $k_{SSB}$ being 0, configuring the number of RBs spaced between the frequency domain lower boundary of the CORESET #0 and the frequency domain lower boundary of the SSB to be −41;

in response to the SCS of the SSB comprising at least one of 240 kHz, 480 kHz and 960 kHz, and the number of REs indicated by the $k_{SSB}$ being greater than 0, configuring the number of RBs spaced between the frequency domain lower boundary of the CORESET #0 and the frequency domain lower boundary of the SSB to be −42; and in response to the SCS of the SSB comprising at least one of 240 kHz, 480 kHz and 960 kHz, and the number of REs indicated by the $k_{SSB}$ being any real number, configuring the number of RBs spaced between the frequency domain lower boundary of the CORESET #0 and the frequency domain lower boundary of the SSB to be 97.

Figure 6:
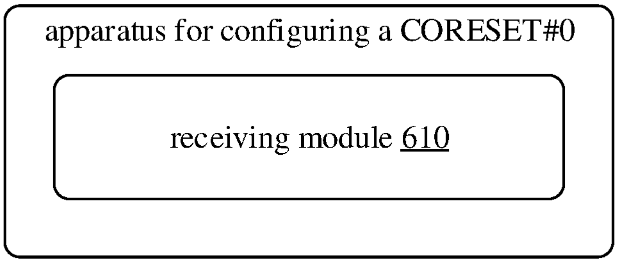
FIG. 6 is a block diagram of an apparatus for configuring a CORESET #0 according to an exemplary embodiment.

As illustrated in FIG. 6, an embodiment of the disclosure provides an apparatus for configuring a CORESET #0, which is executed by a UE. The apparatus includes:

a receiving module 610, configured to receive configuration information of the CORESET #0 configured according to a SCS of a SSB.

In some embodiments, the receiving module 610 may be a program module. After the program module is executed by a processor, it can receive the configuration information of the CORESET #0 configured by a base station side according to the SCS of the SSB.

In some embodiments, the receiving module 610 may further include: a hardware and software combination module. The hardware and software combination module includes but is not limited to: a programmable array. The programmable array includes but is not limited to: a field programmable array or a complex programmable array.

In some embodiments, the receiving module 610 may further include: a pure hardware module. The pure hardware module includes but is not limited to: an application specific integrated circuit.

In some embodiments, a candidate value of the SCS of the SSB includes at least one of the followings:

120 kHz;

240 kHz;

480 kHz; and 960 kHz.

In some embodiments, the configuration information indicates that in response to the SCS of the SSB being 240 kHz, a SCS of the CORESET #0 being one of 120 kHz, 240 kHz, 480 kHz and 960 kHz;

or in response to the SCS of the SSB being 480 kHz, the SCS of the CORESET #0 being one of 120 kHz, 240 kHz, 480 kHz and 960 kHz;

or in response to the SCS of the SSB being 960 kHz, the SCS of the CORESET #0 being one of 120 kHz, 240 kHz, 480 kHz and 960 kHz.

In some embodiments, the SSB carries an indication bit for indicating the SCS of the CORESET #0.

In some embodiments, a carrier band in which the SSB and the CORESET #0 are located includes:

a first band;

and/or, a second band; in which a frequency of the second band is lower than a frequency of the first band.

In some embodiments, the first band includes: 52.6 GHz to 74 GHz.

In some embodiments, in response to the carrier band in which the SSB and the CORESET #0 are located being the first band, the SCS of the SSB and a QCL use different indication bits;

and/or, in response to the carrier band in which the SSB and the CORESET #0 are located being the second band, the SCS of the SSB and the QCL use the same indication bit.

In some embodiments, in response to the SCS of the SSB and the QCL using different indication bits, the QCL shares the same indication bit with a first offset value between the SSB and the CORESET #0, in which the first offset value is a number of RBs offset between the SSB and the CORESET #0.

In some embodiments, a bit value of the indication bit used to indicate the first offset value between the SSB and the CORESET #0 is different from a bit value for indicating the QCL.

In some embodiments, four types of indication values of the QCL are indicated by the same bit value shared by different indication indexes.

In some embodiments, the configuration information indicates at least one of the followings:

in response to the SCS of the SSB including at least one of 240 kHz, 480 kHz and 960 kHz, a multiplexing pattern of the CORESET #0 and the SSB being pattern 2;

in response to the SCS of the SSB including at least one of 240 kHz, 480 kHz and 960 kHz, a number of symbols occupied by the CORESET #0 in a time domain being 1;

in response to the SCS of the SSB including at least one of 240 kHz, 480 kHz and 960 kHz, a number of RBs occupied by the CORESET #0 in a frequency domain being 48 or 96; and in response to the SCS of the SSB including at least one of 240 kHz, 480 kHz and 960 kHz, a number of RBs spaced between a frequency domain lower boundary of the CORESET #0 being 97, −41 or −42.

In some embodiments, the configuration information includes a $k_{SSB}$, the $k_{SSB}$ indicates a number of REs offset between the frequency domain lower boundary of the CORESET #0 and the frequency domain lower boundary of the SSB after a number of RBs are spaced between the frequency domain lower boundary of the CORESET #0 and the frequency domain lower boundary of the SSB.

In some embodiments, in response to the SCS of the SSB including at least one of 240 kHz, 480 kHz and 960 kHz, the number of RBs spaced between the frequency domain lower boundary of the CORESET #0 and the frequency domain lower boundary of the SSB being 97, −41 or −42, including at least one of the followings:

in response to the SCS of the SSB including at least one of 240 kHz, 480 kHz and 960 kHz, and the number of REs indicated by the $k_{SSB}$ being 0, the number of RBs spaced between the frequency domain lower boundary of the CORESET #0 and the frequency domain lower boundary of the SSB being −41;

in response to the SCS of the SSB including at least one of 240 kHz, 480 kHz and 960 kHz, and the number of REs indicated by the $k_{SSB}$ being greater than 0, the number of RBs spaced between the frequency domain lower boundary of the CORESET #0 and the frequency domain lower boundary of the SSB being −42; and in response to the SCS of the SSB including at least one of 240 kHz, 480 kHz and 960 kHz, and the number of REs indicated by the $k_{SSB}$ being any real number, the number of RBs spaced between the frequency domain lower boundary of the CORESET #0 and the frequency domain lower boundary of the SSB being 97.

An embodiment of the disclosure provides a communication device, including:

a memory for storing instructions executable by a processor; and the processor connected to the memory; in which the processor is configured to implement the method for configuring a CORESET #0 provided by any of the foregoing technical solutions.

The processor may include various types of storage mediums, which are non-transitory computer storage mediums capable of continuing to memorize information stored thereon after the communication device is powered down.

The communication device includes: a UE or a base station.

The processor may be connected to the memory via a bus, to read executable programs stored on the memory, e.g., at least one of the methods as shown in FIGS. 3 to 4.

In the technical solution provided by the embodiments of the disclosure, the CORESET #0 is configured according to the SCS of the SSB. The CORESET #0 configured in this way can, on the one hand, enable the UE to easily perform configuration according to a bandwidth supported by the UE under the condition of successfully receiving the SSB. On the other hand, by configuring the CORESET #0 according to the SCS of the SSB, the SCS supported by the CORESET #0 can be consistent with the SCS of the SSB, which simplifies the UE's reception of the CORESET #0. For example, the SCS of the SSB supports 120 kHz, 240 kHz, 480 kHz and 960 kHz, thus, corresponding to one of 120 kHz, 240 kHz, 480 kHz and 960 kHz, a larger SCS is configured for the CORESET #0. In this way, less time domain resources can be configured for the CORESET #0 under the condition that an amount of information in a required transmission band remains unchanged or changes little, thereby reducing a transmission delay for transmitting the CORESET #0 and improving a transmission efficiency.

Figure 7:
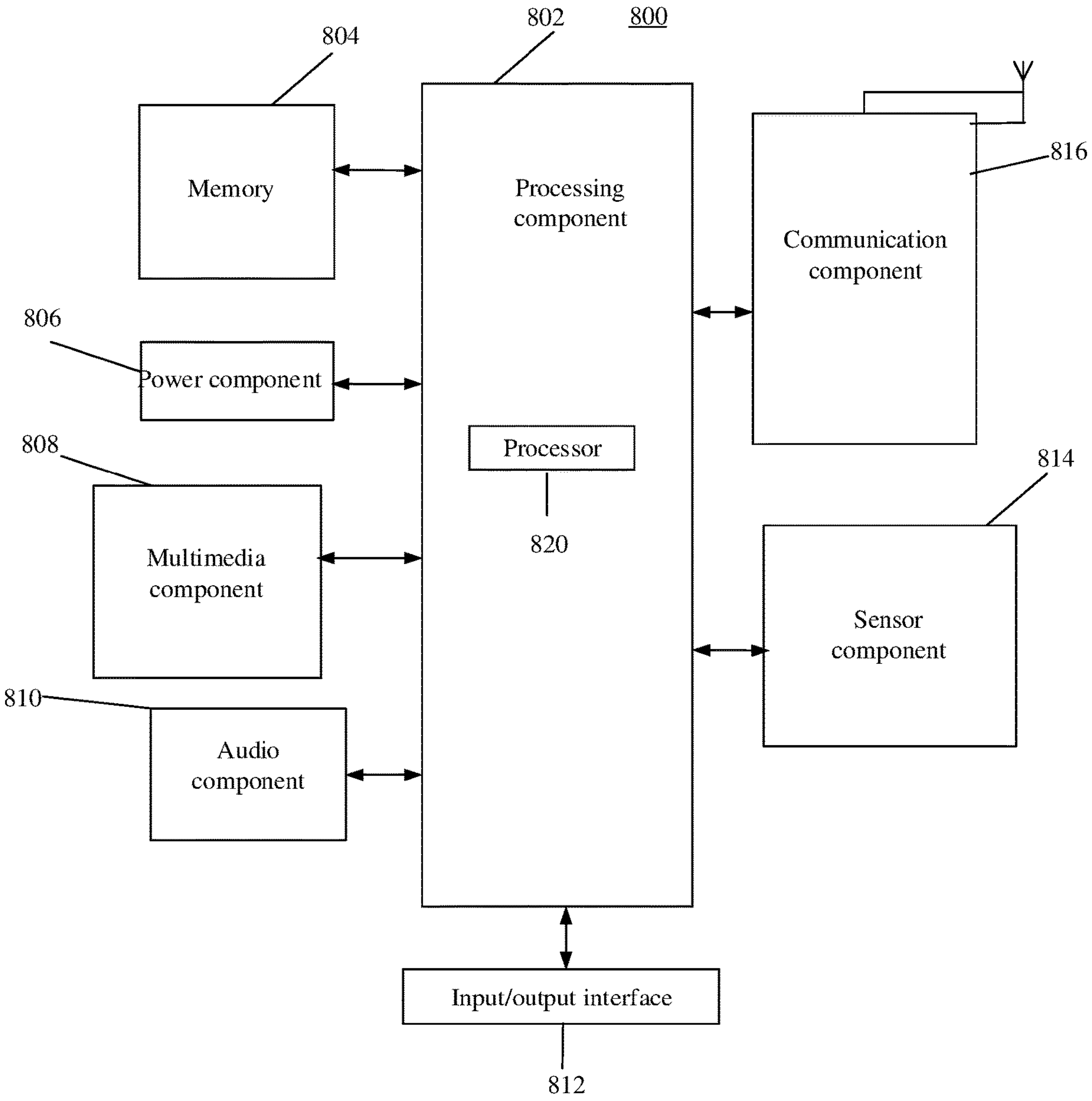
FIG. 7 is a schematic diagram of a user equipment (UE) according to an exemplary embodiment.

FIG. 7 is a block diagram of a UE 800 according to an exemplary embodiment. For example, the UE 800 may be a mobile phone, a computer, a digital broadcasting UE, a message transceiver device, a game console, a tablet device, a medical device, a fitness device and a personal digital assistant.

As illustrated in FIG. 7, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, videos, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a duration and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or a Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G or 3G, or a combination thereof. In an embodiment, the communication component 816 receives a broadcast signal from an external broadcast management system or broadcast associated information via a broadcast channel. In an embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In an exemplary embodiment, the UE 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

Figure 8:
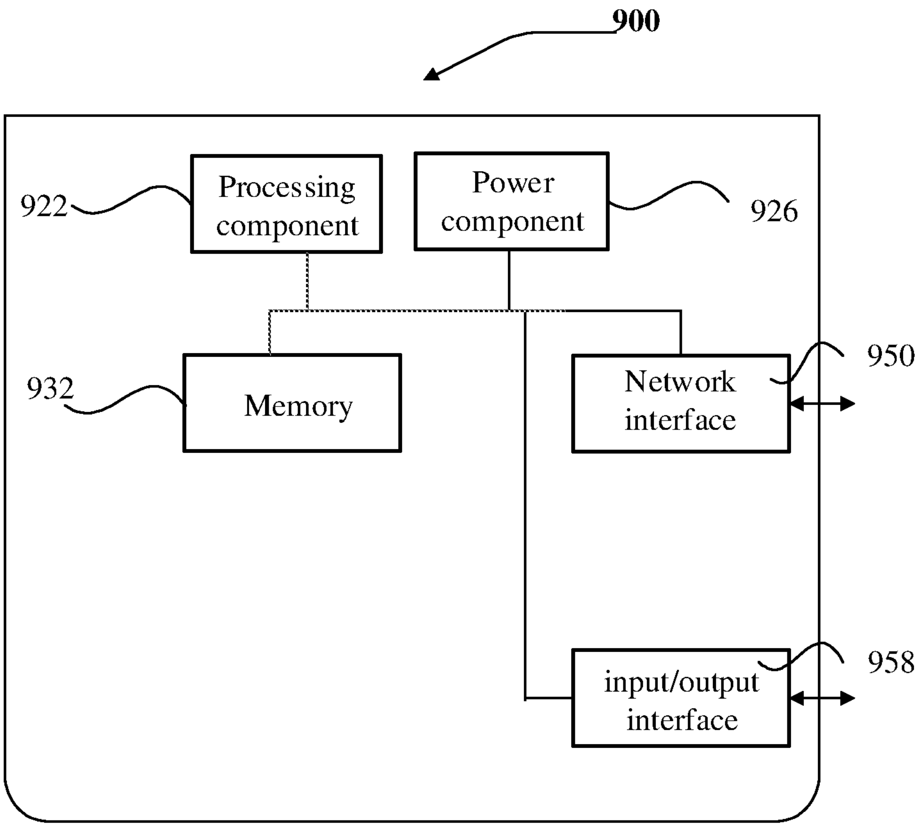
FIG. 8 is a schematic diagram of a base station according to an exemplary embodiment.

As illustrated in FIG. 8, an embodiment of the disclosure illustrates an architecture of an access device. For example, a communication device 900 may be provided as a network side device. The communication device may be an access device and/or a core network device as previously described.

As illustrated in FIG. 8, the communication device 900 includes a processing component 922 consisting of one or more processors, and memory resources represented by a memory 932 for storing instructions that may be executed by the processing component 922, such as applications. The applications stored in the memory 932 may include one or more modules each corresponding to a set of instructions. In addition, the processing component 922 is configured to execute the instructions to perform any of the methods described above that are performed by the access device, for example, the method for configuring a CORESET #0 shown in FIG. 3 and/or FIG. 4.

The communication device 900 may also include a power component 926 configured to perform power management of the communication device 900, a wired or wireless network interface 950 configured to connect the communication device 900 to a network, and an input/output (I/O) interface 958. The communication device 900 may operate based on an operating system stored in the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a control resource set (CORESET) #0, performed by a network device, comprising:

sending configuration information for a subcarrier spacing (SCS) of the CORESET #0 for a frequency range of 52600 MHz to 71000 MHz;

wherein the CORESET #0 is a CORESET for a Type0-physical downlink control channel (PDCCH) common search space (CSS) set;

wherein the SCS of the CORESET #0 is 480 kHz and a SCS of a corresponding synchronization signal and physical broadcast channel block (SSB) is 480 kHz, or the SCS of the CORESET #0 is 960 KHz and a SCS of a corresponding SSB is 960 kHz; and wherein the configuration information comprises at least one of: a number of symbols of the CORESET #0 in a time domain to be 1, or a number of resource blocks (RBs) of the CORESET #0 in a frequency domain to be 48 or 96.

2. The method of claim 1, further comprising:

configuring the SCS of the CORESET #0 according to the SCS of the corresponding SSB; and at least one of:

in a case of the SCS of the SSB being 120 kHz, configuring the SCS of the CORESET #0 to 120 KHz;

in a case of the SCS of the SSB being 240 kHz, configuring the SCS of the CORESET #0 to 240 kHz;

in a case of the SCS of the SSB being 480 kHz, configuring the SCS of the CORESET #0 to 480 kHz; or in a case of the SCS of the SSB being 960 kHz, configuring the SCS of the CORESET #0 to 960 kHz.

3. The method of claim 1, wherein the SSB carries an indication bit for indicating the SCS of the CORESET #0.

4. The method of claim 1, wherein a band of at least one of the SSB or the CORESET #0 comprises at least one of:

a first band; or a second band;

wherein a frequency range of the second band is lower than a frequency range of the first band, wherein the frequency range of the first band comprises: 52.6 GHz to 71 GHz.

5. The method of claim 1, wherein in a case of the SCS of the SSB and a Quasi Co-Location (QCL) using different indication bits, the QCL shares a same indication bit with a first offset value between the SSB and the CORESET #0, wherein the first offset value is a number of resource blocks (RBs) offset between the SSB and the CORESET #0, wherein a bit value of the indication bit used to indicate the first offset value between the SSB and the CORESET #0 is different from a bit value for indicating the QCL;

wherein four types of indication values of the QCL are indicated by a same bit value shared by different indication indexes.

6. The method of claim 1, further comprising:

configuring at least one of:

in a case of the SCS of the SSB comprising at least one of 120 KHz, 240 KHz, 480 kHz, or 960 kHz, configuring a multiplexing pattern of the CORESET #0 and the SSB to be pattern 2;

in a case of the SCS of the SSB comprising 120 KHz or 240 KHz, configuring a number of symbols of the CORESET #0 in a time domain to be 1;

in a case of the SCS of the SSB comprising 120 kHz or 240 KHz, configuring a number of RBs of the CORESET #0 in a frequency domain to be 48 or 96; or in a case of the SCS of the SSB comprising at least one of 120 KHz, 240 kHz, 480 kHz, or 960 kHz, configuring a number of RBs spaced between a frequency domain lower boundary of the CORESET #0 and a frequency domain lower boundary of the SSB to be 97,−41 or −42.

7. The method of claim 1, wherein $k_{ssB}$ is configured to indicate a number of resource elements (REs) offset between a frequency domain lower boundary of the CORESET #0 and a frequency domain lower boundary of the SSB, or wherein the configuration information comprises an Offset, the Offset is defined with respect to the SCS of the CORESET #0 to indicate a number of RBs offset from a frequency domain lower boundary of the CORESET #0 to a frequency domain lower boundary of the SSB.

8. A method for configuring a control resource set (CORESET) #0, performed by a user equipment (UE), comprising:

determining configuration information for a subcarrier spacing (SCS) of the CORESET #0 for a frequency range of 52600 MHz to 71000 MHz;

wherein the CORESET #0 is a CORESET for a Type0-physical downlink control channel (PDCCH) common search space (CSS) set;

wherein the SCS of the CORESET #0 is 480 kHz and a SCS of a corresponding synchronization signal and physical broadcast channel block (SSB) is 480 kHz, or the SCS of the CORESET #0 is 960 KHz and a SCS of a corresponding SSB is 960 kHz; and wherein the configuration information comprises at least one of: a number of symbols of the CORESET #0 in a time domain to be 1, or a number of resource blocks (RBs) of the CORESET #0 in a frequency domain to be 48 or 96.

9. The method of claim 4, further comprising:

determining the SCS of the CORESET #0 according to the SCS of the corresponding SSB; and at least one of:

in a case of the SCS of the SSB being 120 kHz, determining the SCS of the CORESET #0 being 120 kHz;

in a case of the SCS of the SSB being 240 kHz, determining the SCS of the CORESET #0 being 240 kHz;

in a case of the SCS of the SSB being 480 kHz, determining the SCS of the CORESET #0 being 480 kHz; or in a case of the SCS of the SSB being 960 kHz, determining the SCS of the CORESET #0 being 960 kHz.

10. The method of claim 8, wherein the SSB carries an indication bit for indicating the SCS of the CORESET #0.

11. The method of claim 8, wherein a band of at least one of the SSB or the CORESET #0 comprises at least one of:

a first band; or a second band;

wherein a frequency range of the second band is lower than a frequency range of the first band, wherein the frequency range of the first band comprises: 52.6 GHz to 71 GHz.

12. The method of claim 8, wherein in a case of the SCS of the SSB and a Quasi Co-Location (QCL) using different indication bits, the QCL shares the same indication bit with a first offset value between the SSB and the CORESET #0, wherein the first offset value is a number of RBs offset between the SSB and the CORESET #0, wherein a bit value of the indication bit used to indicate the first offset value between the SSB and the CORESET #0 is different from a bit value for indicating the QCL, wherein four types of indication values of the QCL are indicated by a same bit value shared by different indication indexes.

13. The method of claim 8, wherein the configuration information indicates at least one of:

in a case of the SCS of the SSB comprising 120 kHz, 240 kHz, 480 kHz, or 960 kHz, a multiplexing pattern of the CORESET #0 and the SSB being pattern 2;

in a case of the SCS of the SSB comprising 120 KHz or 240 kHz, a number of symbols of the CORESET #0 in a time domain being 1;

in a case of the SCS of the SSB comprising 120 kHz or 240 kHz, a number of RBs of the CORESET #0 in a frequency domain being 48 or 96; or in a case of the SCS of the SSB comprising at least one of 120 KHz, 240 KHz, 480 kHz, or 960 kHz, a number of RBs spaced between a frequency domain lower boundary of the CORESET #0 and a frequency domain lower boundary of the SSB being 97,−41 or −42.

14. The method of claim 8, wherein the configuration information comprises a $k_{ssB}$, the $k_{ssB}$ is configured to indicate a number of resource elements (REs) offset between a frequency domain lower boundary of the CORESET #0 and a frequency domain lower boundary of the SSB, or wherein the configuration information comprises an Offset, the Offset is defined with respect to the SCS of the CORESET #0 to indicate a number of RBs offset from a frequency domain lower boundary of the CORESET #0 to a frequency domain lower boundary of the SSB.

15. A network device, comprising:

a processor;

a transceiver; and a memory storing programs executable by the processor, wherein the processor is configured to perform;

sending configuration information for a subcarrier spacing (SCS) of a control resource set (CORESET) #0 for a frequency range of 52600 MHz to 71000 MHz;

wherein the CORESET #0 is a CORESET for a Type0-physical downlink control channel (PDCCH) common search space (CSS) set;

wherein the SCS of the CORESET #0 is 480 kHz and a SCS of a corresponding synchronization signal and physical broadcast channel block (SSB) is 480 kHz, or the SCS of the CORESET #0 is 960 kHz and a SCS of a corresponding SSB is 960 kHz; and wherein the configuration information comprises at least one of: a number of symbols of the CORESET #0 in a time domain to be 1, or a number of resource blocks (RBs) of the CORESET #0 in a frequency domain to be 48 or 96.

16. A user equipment, comprising:

a processor;

a transceiver; and a memory storing programs executable by the processor, wherein the processor is configured to perform the method of claim 8.

17. The method of claim 6, wherein $k_{ssB}$ is configured to indicate a number of resource elements (REs) offset between a frequency domain lower boundary of the CORESET #0 and a frequency domain lower boundary of the SSB; wherein in a case of the SCS of the SSB comprising at least one of 120 KHz, 240 kHz, 480 kHz, or 960 kHz, configuring the number of RBs spaced between the frequency domain lower boundary of the CORESET #0 and the frequency domain lower boundary of the SSB to be 97,−41 or −42, comprises at least one of:

in a case of the SCS of the SSB comprising at least one of 120 KHz, 240 kHz, 480 kHz, or 960 kHz, and the number of REs indicated by the $k_{ssB}$ being 0, configuring the number of RBs spaced between the frequency domain lower boundary of the CORESET #0 and the frequency domain lower boundary of the SSB to be −41;

in a case of the SCS of the SSB comprising at least one of 120 kHz, 240 kHz, 480 kHz, or 960 kHz, and the number of REs indicated by the kssB being greater than 0, configuring the number of RBs spaced between the frequency domain lower boundary of the CORESET #0 and the frequency domain lower boundary of the SSB to be −42; or in a case of the SCS of the SSB comprising at least one of 120 KHz, 240 kHz, 480 kHz, or 960 kHz, and the number of REs indicated by the $k_{ssB}$ being any real number, configuring the number of RBs spaced between the frequency domain lower boundary of the CORESET #0 and the frequency domain lower boundary of the SSB to be 97.

18. The method of claim 13, wherein the configuration information comprises a $k_{SSB}$, the $k_{ssB}$ is configured to indicate a number of resource elements (REs) offset between a frequency domain lower boundary of the CORESET #0 and a frequency domain lower boundary of the SSB; wherein in a case of the SCS of the SSB comprising at least one of 120 kHz, 240 kHz, 480 kHz, or 960 kHz, the number of RBs spaced between the frequency domain lower boundary of the CORESET #0 and the frequency domain lower boundary of the SSB being 97,−41 or −42, comprises at least one of:

in a case of the SCS of the SSB comprising at least one of 120 KHz, 240 KHz, 480 kHz, or 960 kHz, and the number of REs indicated by the $k_{ssB}$ being 0, the number of RBs spaced between the frequency domain lower boundary of the CORESET #0 and the frequency domain lower boundary of the SSB being −41;

in a case of the SCS of the SSB comprising at least one of 120 kHz, 240 kHz, 480 kHz, or 960 kHz, and the number of REs indicated by the $k_{ssB}$ being greater than 0, the number of RBs spaced between the frequency domain lower boundary of the CORESET #0 and the frequency domain lower boundary of the SSB being −42; or in a case of the SCS of the SSB comprising at least one of 120 kHz, 240 kHz, 480 kHz, or 960kHz, and the number of REs indicated by the $k_{ssB}$ being any real number, the number of RBs spaced between the frequency domain lower boundary of the CORESET #0 and the frequency domain lower boundary of the SSB being 97.

19. The method of claim 1, further comprising: sending a pdcch-ConfigSIB1 including controlResourceSetZero to a UE.

20. The method of claim 8, further comprising: receiving a pdcch-ConfigSIB1 including controlResourceSetZero.

* * * * *